United States Patent [19]

Hashimoto et al.

[11] 4,425,682

[45] Jan. 17, 1984

[54] CLAMP FOR HOSES AND THE LIKE

[76] Inventors: Seiichi Hashimoto, 51, 4-chome, Nagata-Higashi, Higashi-Osaka-shi, Osaka-Fu; Takaaki Aoki, Tamaebashi-Bldg., 3-36, 4-chome, Nakanoshima, Kita-Ku, Osaka-shi, both of Japan

[21] Appl. No.: 499,423

[22] Filed: Jun. 3, 1983

Related U.S. Application Data

[63] Continuation of Ser. No. 206,578, Nov. 13, 1980, abandoned.

[30] Foreign Application Priority Data

Jul. 19, 1980 [JP] Japan .................. 55-98920

[51] Int. Cl.³ .............. B65D 63/04; F16L 33/02
[52] U.S. Cl. .................. 24/20 S; 24/20 R; 24/23 R; 24/557; 248/74 B
[58] Field of Search ............ 24/20 S, 20 CW, 20 R, 24/25, 256, 259 FS, 259 RC, 259 R, 264, 268; 285/242, 249, 252, 253, 420; 248/74 A, 74 B; 294/99 R; 128/346; 138/99

[56] References Cited

U.S. PATENT DOCUMENTS

| 691,155 | 1/1902 | Marsky | 24/256 |
|---|---|---|---|
| 912,955 | 2/1909 | Harber | 24/256 |
| 2,267,586 | 12/1941 | Del Camp | 248/74 B |
| 2,393,063 | 1/1946 | Robertson | 248/74 B |
| 2,663,815 | 12/1953 | Mucher | 24/257 R |
| 3,434,745 | 3/1969 | Jackman | 285/242 |
| 4,305,179 | 12/1981 | Sakurada | 24/23 R |

FOREIGN PATENT DOCUMENTS

| 2606736 | 9/1977 | Fed. Rep. of Germany | 24/205 |
|---|---|---|---|
| 3026582 | 2/1982 | Fed. Rep. of Germany | 24/205 |
| 811968 | 10/1936 | France | 24/205 |
| 28262 | of 1911 | United Kingdom | 24/205 |
| 1560606 | 2/1980 | United Kingdom | 24/205 |

*Primary Examiner*—Gene Mancene
*Assistant Examiner*—John G. Weiss
*Attorney, Agent, or Firm*—Armstrong, Nikaido, Marmelstein & Kubovcik

[57] ABSTRACT

A clamp useful for connecting fluid-conveying hoses and the like to couplings, valves and the like. The clamp is formed of a spring metal strip which has portions of its longitudinal parallel linear edges cut to provide a pair of parallel inclined linear edges such that the original constant width of the strip is gradually reduced toward the longitudinal opposite ends of the strip so that the width of the strip varies in proportion to the bending moment produced in the strip, with the thus narrowed opposite ends being bent in mutually opposed relation to provide operating knobs for forcibly spreading the ring diameter. The spring metal strip thus prepared is then wound into a ring of right circle, with the inclined linear edges abutting against each other along a given length, thereby ensuring uniform bending stress throughout the ring.

3 Claims, 15 Drawing Figures

FIG. 11 (II)

FIG. 11 (III)

FIG. 11 (IV)

CLAMP FOR HOSES AND THE LIKE

This application is a continuation, of application Ser. No. 206,578, filed Nov. 13, 1980 now abandoned.

BACKGROUND OF THE INVENTION

The present invention relates to a clamp used for removably connecting various fluid-conveying flexible hoses and the like to joints, valves, cocks and the like.

Generally speaking, such clamps used on hoses and the like are classified into three types, namely, a first type in which a single spring metal wire is wound into a pair of juxtaposed concentric rings so that the hose or the like is clamped either by the self-restoring resilient force of the circular rings or by a manual contracting force applied thereto at the opposite ends of the convolutions so as to reduce the ring diameter, a second type in which a non-spring metal strip is formed with a series of meshing holes and wound into a circular ring to serve as a worm wheel, while an operating threaded rod held on the circular ring by an attaching housing and serving as a worm is engaged with said meshing holes in the strip, so that manual rotation of the threaded rod reduces the circular ring diameter to clamp the hose or the like, and a third type in which a spring metal strip is wound into a circular ring, whose self-restoring resilient force tending to reduce the ring diameter is utilized to clamp the hose or the like.

In the third type of clamp, however, if it is formed by winding a spring metal strip of uniform thickness and width, the ring diameter, when expanded or contracted, generally assumes an oval or ellipse rather than a right circle because the bending rigidity becomes greater toward the cut ends (opposite terminal edges) of the circular ring. Therefore, if this is used to clamp the hose or the like, the circular ring will not act on the entire periphery of the hose or the like with uniform clamping force, so that there is a danger that the gas, such as air, flowing through the hose or the like will leak. Prevention of leakage of fluid must be said to be of utmost importance for the third type of clamp designed to clamp the hose or the like in a natural manner, namely, by the self-restoring resilient force or self-contracting force produced by winding a spring metal strip into a circular ring, unlike the second type of clamp designed to clamp the hose or the like by a manual operating force applied to the screw.

Therefore, conventionally, as will be fully described in connection with embodiments of the invention, in order to ensure uniform bending stress throughout the periphery of the circular ring while maintaining the uniform thickness and width of said spring metal strip, the central region of the strip is formed with triangular or other similar openings by a punch and die assembly. Such arrangement, however, makes the die and working implements correspondingly complicated because of the need of forming said openings and can hardly accomodate changes in the size of the products. Further, there is also a problem about the effective use of material. Further, in the developed or unfolded planar form of the long-sized strip after shearing operation, the right and left halves on both sides of the imaginary winding center line are not of the same or symmetrical simple shape, so that they differ in bending rigidity from each other. This, coupled with the fact that the inclined edges of the triangular openings are relatively short, makes the circular ring inferior in circularity, causing a problem that it is difficult to ensure uniform clamping force on the entire periphery of the hose or the like and smooth expanding operation on the circular ring.

SUMMARY OF THE INVENTION

The present invention is based on the third type clamp in which a spring metal strip of uniform width and thickness is wound into a circular ring. The invention has been accomplished to remedy the drawbacks inherent in this type of clamp.

Accordingly, a first object of the invention is to provide a clamp formed of a spring metal strip of constant width which has its longitudinal opposite linear sides cut to provide parallel inclined linear edges of given length crossing the imaginary longitudinal center line, so that the width of the strip is gradually reduced toward the opposite ends substantially to assume the form of a parallelogram such that said width varies in proportion to the bending moment, so as to ensure uniform stress throughout the periphery of the circular ring. This arrangement obviates the need to form said openings, greatly simplifies the die and accessory implements and accommodates changes in the size of the products by simply changing the shearing cutter, thus providing increased productivity.

A second object of the invention is to provide a clamp wherein in the developed planar form of the circular ring, the strip is shaped substantially into a parallelogram, as described above, whereby the right and left halves on both side of the imaginary winding center line are of the same or symmetrical simple shape, thereby simplifying shearing operation and ensuring uniform bending rigidity on both sides and hence improved circularity when the clamp is deformed. According to this arrangement, uniform clamping force on the entire periphery of the hose or the like, and smooth operation during expansion of the circular ring can be achieved.

A third object of the invention is to provide a clamp wherein the longitudinal opposite ends of the narrowed portion defined by the parallel inclined linear edges, namely, the ends of the major diagonal of the parallelogram, are upwardly bent to provide a pair opposed operating knobs for forcibly expanding the ring diameter, which means that a pair of operating knobs having the same or symmetrical shape can be easily and integrally formed, thereby making smooth the operation of expanding the ring diameter by fingers or a tool, such as pliers.

Other objects of the invention will become apparent from a reading of the following description in conjunction with the accompanying drawings.

DESCRIPTION OF THE PREFERRED EMBODIMENTS

Figure 1:
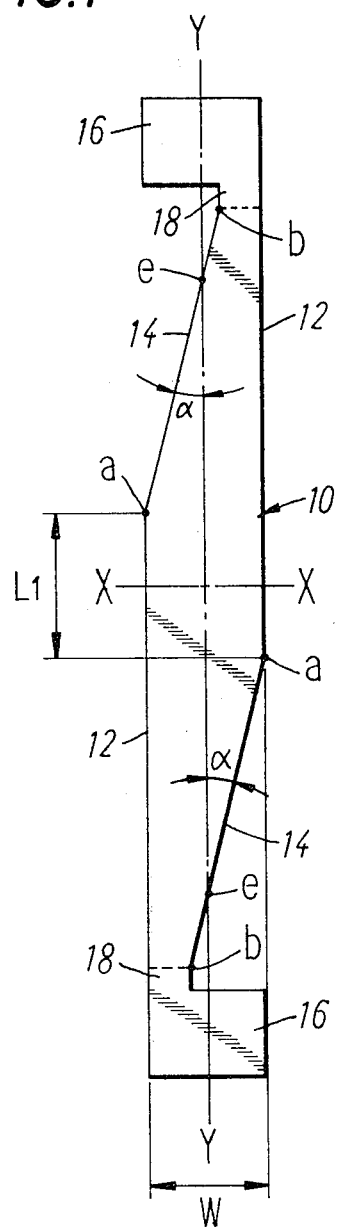
FIG. 1 is a developed plan view of a clamp according to the present invention.
Figure 2:
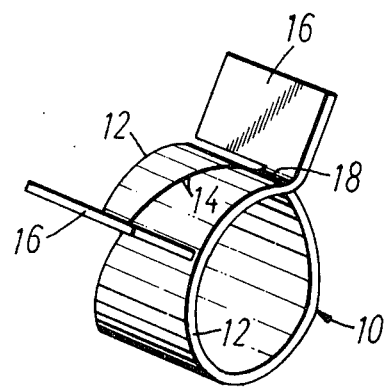
FIG. 2 is a perspective view of a completed three-dimensional product formed by winding the strip shown in FIG. 1.

FIG. 1 shows a clamp in a developed planar state (material processing state) according to the invention and FIGS. 2 through 8 show a completed three-dimensional product formed by winding the material shown in FIG. 1. The clamp is formed of a metal strip of uniform thickness t (e.g., about 0.8 mm thick steel plate) which has been hardened and which has spring restorability, such strips being cut out successively from a long-sized strip material having a uniform width W.

A main portion 10 which serves to clamp a hose corresponds to the circular ring portion of the product. In this hose clamping main portion 10, the width W of the strip is gradually reduced toward the longitudinal opposite ends such that the width varies in proportion to the bending moment. The gradual narrowing is such that portions of the longitudinal parallel opposite edges 12 of the strip are cut to provide a pair of parallel inclined linear edges 14 of given length crossing the imaginary longitudinal center axis Y.

As is evident from the developed plan view in FIG. 1, the width of the hose clamping main portion 10 is at a maximum, which is the same as the strip width W, in the central region of the strip and at a minumum at the longitudinal opposite ends. In one half of the hose clamping main portion 10, the left-hand side linear edge of the strip is converted to the inclined linear edge 14, while in the other half, the right-hand side linear edge is converted to the inclined linear edge 14. By determining the opposite inclined linear edges 14 so that they are parallel with each other, the hose clamping main portion 10 assumes substantially the form of a parallelogram defined by the pair of parallel inclined opposite linear edges 14 of given length crossing the imaginary longitudinal center line Y and by the pair of original or general linear opposite edges 12, as shown in FIG. 1. Therefore, the opposite regions of the hose clamping main portion 10 on both sides of the imaginary winding center line X crossing at right angles with the imaginary longitudinal center line Y are point-symmetrical with each other.

In this case, the respective proximal ends a of the two inclined linear edges 14 are not disposed on said imaginary winding center line X but are deviated somewhat toward the opposite longitudinal ends, as shown in FIG. 1, in order that portions of the linear edges 12 parallel with the imaginary longitudinal center line Y which are left as a constant small lengh $L_1$ in the central region of the strip may serve as a clamp or chuck section during winding of the planar strip into a circular ring on a forming machine, so as to correctly determine the direction of winding by fixing the same.

Figure 9:
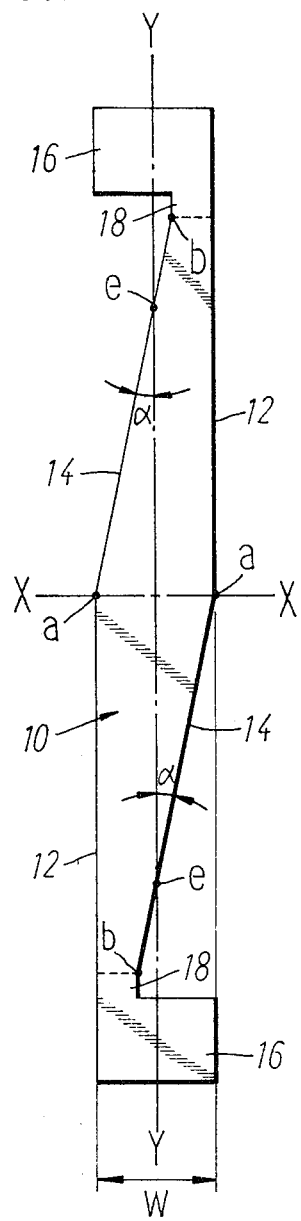
FIGS. 9 and 10 is a developed plan view of a modification corresponding to FIG. 1, respectively.

However, if such guide for positioning in the winding direction is unnecessary because of the performance of the forming machine employed or if said positioning and guiding can be effected by other methods or means, there is no need to leave said linear edge portions of given length $L_1$ shown in FIG. 1 and it is preferable to dispose the respective proximal ends a of the inclined linear edges 12 on the imaginary winding center line X, as shown in FIG. 9, to make each inclined linear edge 14 as long as possible so that it corresponds to half the length of the hose clamping main portion 10. The angle α at which the inclined linear edges 14 cross the imaginary longitudinal center line Y will vary according to the size of the product, in correlation to the strip width W and the length of the strip.

In FIG. 1, 16 denotes a pair of operating knobs integral with the strip and positioned at the opposite ends of the narrowed regions of the hose clamping main portion 10 (that is, the ends of the major diagonal of the hose clamping main portion which is substantially in the form of a parallelogram). As shown in FIGS. 2 through 8, they are formed by upwardly bending the ends of the strip into opposed relation when the latter is wound into a circular ring, and they are used to forcibly spreading the ring diameter D. The fact that such pair of operating knobs 16 are formed integrally with the hose clamping main portion 10 means that the clamp of the invention is formed of generally elongated Z-shaped strip as shown in FIG. 1.

In FIG. 1, the character b denotes the respective distal ends of the inclined linear edges 14. It is preferable that the roots 18 of the operating knobs 16 extending from said distal ends b be as narrow as possible provided that there is no danger of breakage or abnormal deformation of the product when the latter is actually used, so as to minimize non-uniform bending stress in the vicinity of the opposite edges of the strip. For this purpose, in the present invention, as is evident from FIG. 1, the inclined linear edges 14 of the hose clamping main portion 10 are extended beyond the intersections e between said edges and the imaginary longitudinal center line Y of the strip until they are close to the opposite linear edges 12, and the roots 18 of the operating knobs 16 are integral with the ends of the hose clamping main portion 10. Thus, the width of the roots 18 of the operating knobs 16 is somewhat smaller than half the width W of the strip.

Figure 10:
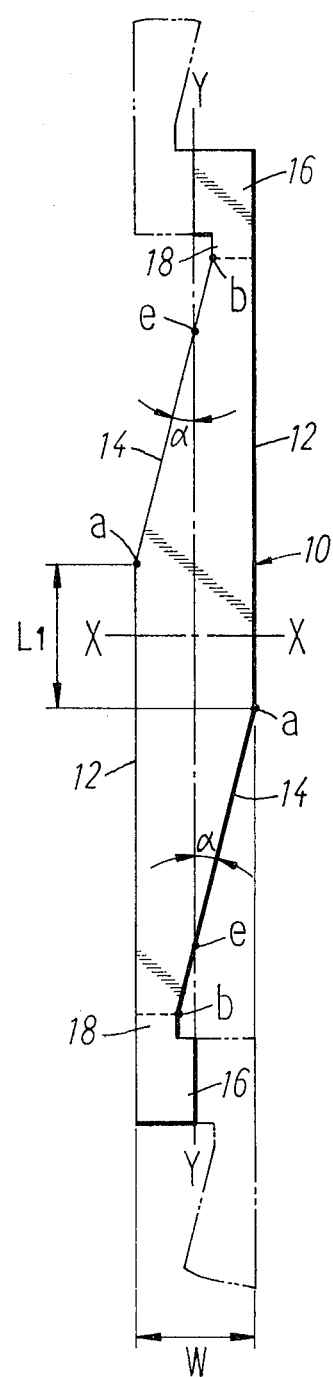

The width of the operating knobs 16 extending wider than the roots 18 has been shown equal to the width W of the strip in FIG. 1, but it may be smaller than the width W of the strip, as shown in FIG. 10. According to this arrangement, a number of clamps can be cut out successively from a long-sized strip material of constant width W, as indicated in phantom lines in FIG. 10. This is advantageous from the standpoint of economical use of material.

Figure 11:
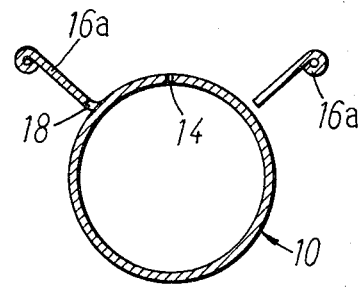
FIGS. 11 (I) through (V) are developed plan views showing modifications corresponding to FIG. 8.
Figure 11:
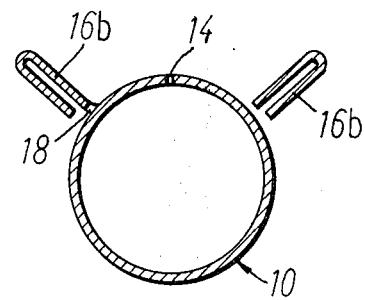
Figure 11:
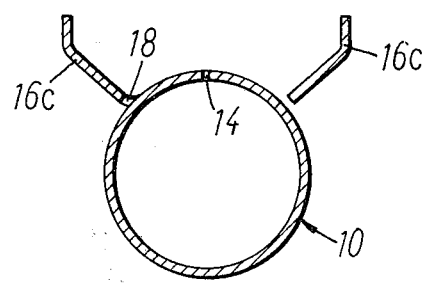
Figure 11:
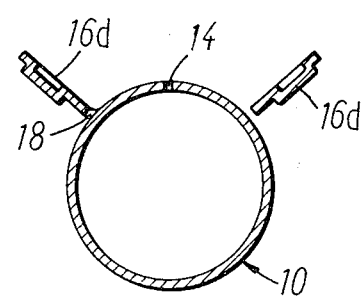
Figure 11:
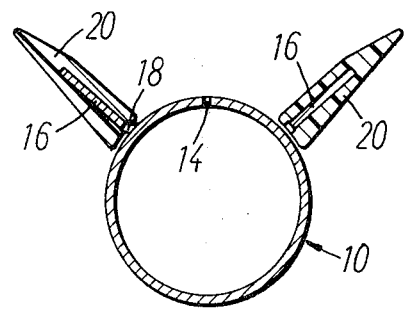

FIG. 11 illustrates various cross-sectional shapes of operating knobs 16. Operating knobs 16a, 16b, 16c and 16d shown in FIGS. 11 (I) through (IV) are made of metal and press-worked. However, the same operating knobs 16 as those shown in FIG. 1 may each be integrally fitted with a separate plastic or rubber cover 20, as shown in FIG. 11 (V). Since such operating knobs are used to impart force for spreading the ring diameter D not only by the operator's fingers but also by tools such as pliers, it is possible to suitably select other forms than those illustrated. In any case, the pair of operating knobs in the invention can be of the same or symmetrical shape and easily formed on the opposite ends of the hose clamping main portion 10 since the latter is substantially in the form of a parallelogram. In addition, in FIGS. 9 through 11 illustrating modifications of clamps according to the invention, portions or parts marked with the same characters as those in FIGS. 1 through 8 correspond to those shown in the latter, and a detailed description thereof is omitted.

The strip comprising the hose clamping main portion 10 and the pair of operating knobs 16 integral therewith, as shown in FIG. 1, is then wound by a forming machine so that the hose clamping main portion 10 becomes a ring of right circle, to provide a product shown in FIGS. 2 through 8. In this case, the pair of inclined linear edges 14 are brought into substantially abutting relation, with an overlap of constant length $L_2$.

Figure 3:
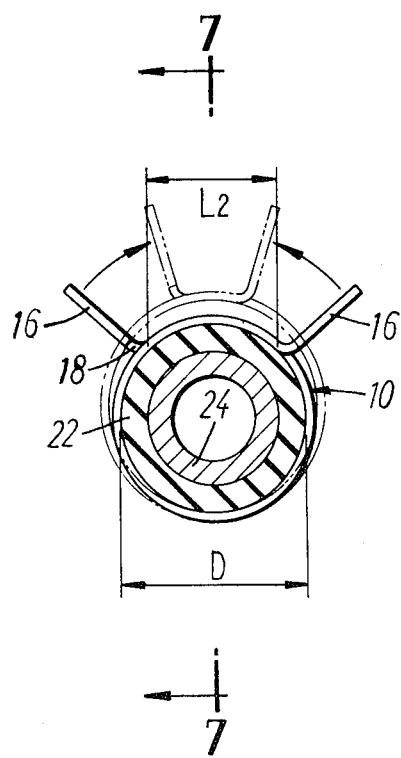
FIG. 3 is a front view of said product.
Figure 4:
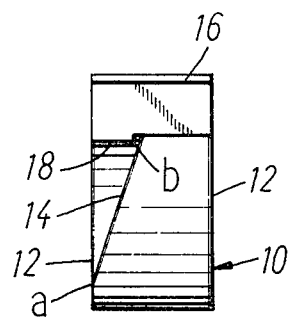
FIG. 4 is a side view of said product.
Figure 7:
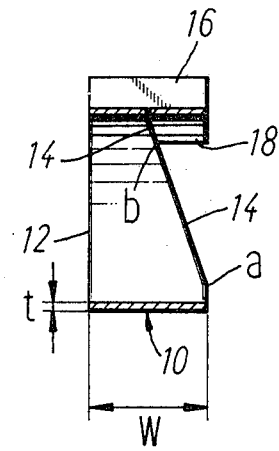
FIG. 7 is a sectional view of the clamp alone, taken along the line 7—7 of FIG. 3.
Figure 5:
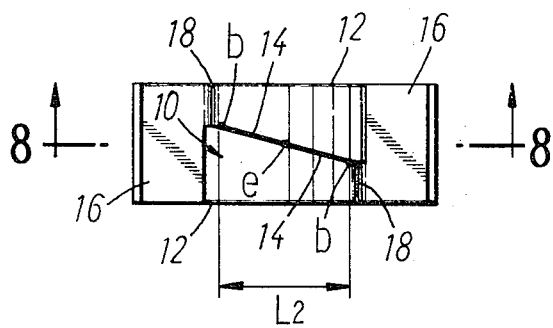
FIG. 5 is a plan view of said product.
Figure 6:
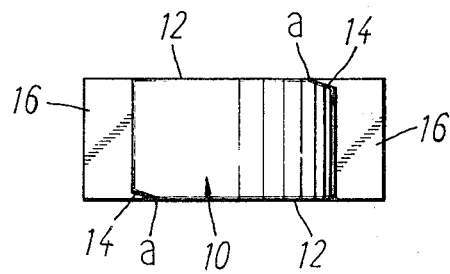
FIG. 6 is a bottom view of said product.
Figure 8:
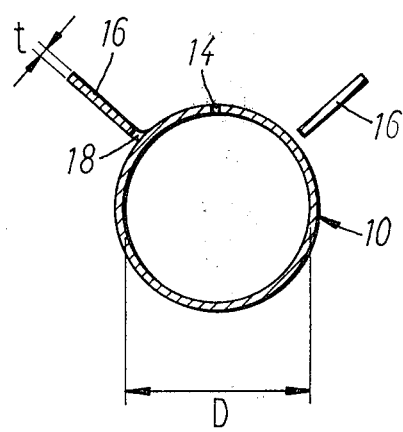
FIG. 8 is a sectional view taken along the line 8—8 of FIG. 5.

In this overlapped state, the intersections e between the inclined linear edges 14 and the imaginary longitudinal center line Y are positioned exactly on a line bisecting the overlap length $L_2$, as is evident from FIGS. 3 and 5, with the pair of operating knobs 16 opposed to each other on both sides of said bisecting line.

In the clamp of the present invention, the original linear edges 12 of the hose clamping main portion 10 to be wound into a circular ring are cut to provide a pair of inclined linear edges 14. The purpose of this arrangement is to ensure that with the gradual reduction of the strip width W toward the longitudinal opposite ends, the bending stress in the circular ring is uniform throughout the periphery thereof to make it possible to expand or contract the ring diameter D while maintaining the right or true circularlity thereof. The fact that this purpose can be achieved in view of the developed or unfolded planar state (material working state) of such inclined cutting leaf type (which refers to the substantial parallelogram having no openings in the hose clamping main portion) is proved by the following analysis.

Figure 12:
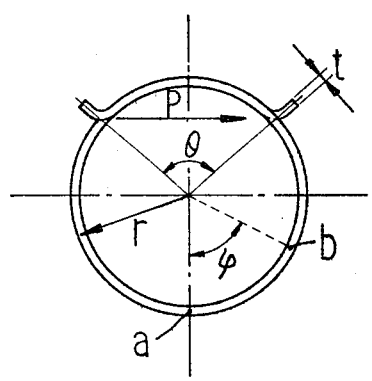
FIG. 12 is a front view corresponding to FIG. 3, showing how the shape and size are determined.

The metal strip used in the invention is very small in thickness t as compare with the ring diameter D (usually, t/D < 0.5 or less), so that it may be considered to be a kind of beam. Thus, supposing that the influences of shearing force and axial force can be neglected, the stress $\sigma\phi$ at an arbitrary point b (positional angle $\phi$) shown in FIG. 12 can be expressed by the following equation.

$$\sigma \approx \frac{M}{A \cdot r} + \frac{M}{I} \cdot \frac{rt}{2r + t} \tag{1}$$

where $A$ (cross-sectional area) $= b\phi \cdot t$, $I$ (second moment of area) $= \frac{1}{12} b\phi \cdot t^3$, and $M$ (bending moment) $= -P \cdot r \left( \cos \frac{\theta}{2} + \cos\phi \right)$ Solving Equation (1) gives $$\sigma\phi \approx -\frac{P}{b\phi \cdot t} \left( \cos \frac{\theta}{2} + \cos\phi \right) \left( 1 + \frac{12r^2}{t(2r + t)} \right) \tag{2}$$

In this case, the position of maximum stress is a point a where $\phi = 0$. At this point a, $\cos \phi = \cos 0 = 1$ and the strip width $b\phi$ is at a maximum (bmax).

Therefore, the stress $\sigma$max at the point a of maximum width bmax is expressed by the following equation.

$$\sigma\text{max} \approx -\frac{P}{b\text{max} \cdot t} \left( \cos \frac{\theta}{2} + 1 \right) \left( 1 + \frac{12r^2}{t(2r + t)} \right) \tag{3}$$

Conditions for uniform stress require that $\sigma$max $= \sigma\phi$. Thus, putting Equations (2) and (3) equal to each other gives $$-\frac{P}{b\phi \cdot t} \left( \cos \frac{\theta}{2} + \cos\phi \right) \left( 1 + \frac{12r^2}{t(2r + t)} \right) = \tag{4}$$

$$-\frac{P}{b\text{max} \cdot t} \left( \cos \frac{\theta}{2} + 1 \right) \left( 1 + \frac{12r^2}{t(2r + t)} \right)$$

Reducing this equation gives $$\frac{\cos \frac{\theta}{2} + \cos\phi}{b\phi} = \frac{\cos \frac{\theta}{2} + 1}{b\text{max}} \tag{5}$$

$$\therefore \frac{b\phi}{b\text{max}} = \frac{\cos \frac{\theta}{2} + \cos\phi}{\cos \frac{\theta}{2} + 1}$$

In Equation (5), cos ($\sigma/2$) is an arbitrary constant (which means that it becomes a constant once the shape is determined irrespective of the size.) Thus, representing it by C to simplify Equation (5) gives $$\frac{b\phi}{b\text{max}} = \frac{C + \cos\phi}{C + 1} \tag{6}$$

Equation (6) shows that the ratio of the strip width $b\phi$ at arbitrary point b to the maximum width bmax at point a is equal to the first-order ratio of the cosine of the positional angle (cos $\phi$).

Linear equations represent straight lines. Thus, if the point b of arbitrary width and the point a of maximum width have uniform stress produced therein, the width at any arbitrary position is uniquely determined with respect to the positional angle thereof such that the line connecting the points a and b is a straight line.

The present invention is founded on such theoretical basis and characterized in that the hose clamping main portion 10 is shaped to have a pair of inclined linear edges 14, as described above. In view of the need to arrange the clamp of the invention so that a forcible spreading force against the spring force of the ring diameter D can be manually applied to the clamp, a pair of operating knobs 16 are continuously formed on the opposite ends of the hose clamping main portion 10, thereby completing the product.

In using the clamp of the invention, the operator squeezes the pair of operating knobs 16 in the direction of arrows shown in FIG. 3, by his fingers or a tool, so as to forcibly expand the circular ring diameter D, as shown in phantom lines, whereupon the operator fits the clamp on a hose or the like 22 and then releases the operating force. In so doing, the resilient restoring force resulting from winding the strip causes the ring diameter D to automatically or naturally contract, so that the hose or the like 22 is firmly clamped on the mouth portion 24 of a joint, valve or other implement, as shown in solid lines in said figure. It is, of course, possible to extract the hose or the like 22 from said mouth portion 24 for exchange by applying a similar operating force.

In such deformed state of the clamp, since the hose clamping main portion 10 corresponding to the circular ring has its opposite linear edges 12 gradually narrowed toward the longitudinal opposite ends by conversion into parallel partial inclined linear edges so that the strip width W is proportional to the bending moment, the various portions of the circular ring remain deformed while retaining the true or right circularity to uniformly clamp the entire peripheral surface of the hose or the like 22. Thus, there is provided a reliable product which is effective to prevent leakage of fluid.

Figure 13:
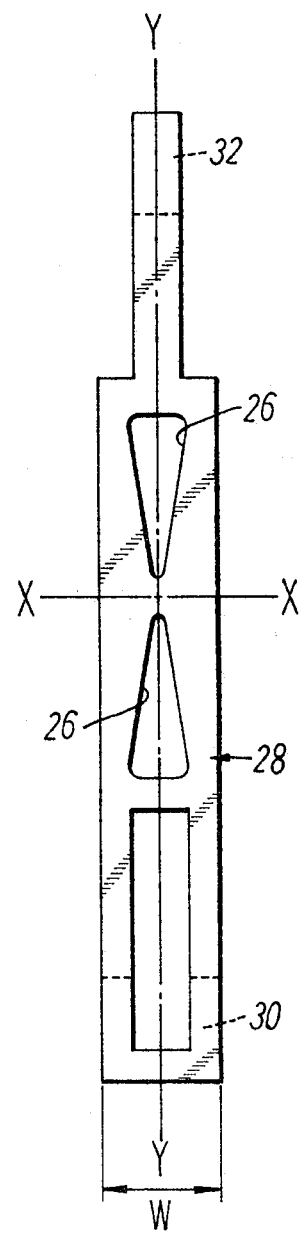
FIG. 13 is a developed plan view of a conventional article for comparison with FIG. 1.
Figure 14:
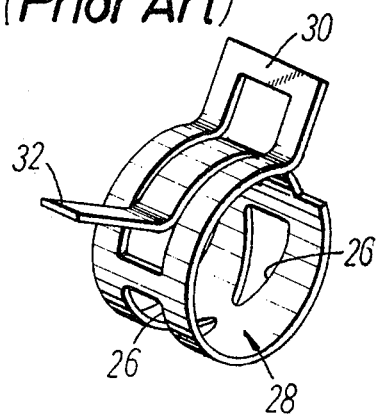
FIG. 14 is a perspective view of the conventional article for comparison with FIG. 2.

Since the present invention is arranged in the manner described above in obtaining uniform stress throughout the periphery of the circular ring, the following effects can be achieved as compared with a conventional clamp of this type shown in FIGS. 13 and 14.

The conventional article referred to at the outset formed with triangular or other similar openings 26 in the vicinity of the axis around which the strip is wound, as an arrangement for ensuring uniform stress throughout the periphery of the circular ring, as is evident from FIGS. 13 and 14. This arrangement, however, results in loss of material due to formation of the openings 26 and in the need to a separate punch and die assembly. Further, since the openings 26 must be formed by said assembly after shearing operation, the process lacks simplicity. It is also necessary to change said assembly according to changes in the size of the products, which is disadvantageous to mass production.

In contrast therewith, according to the invention, since the longitudinal linear edges 12 of the strip are cut to provide a pair of inclined linear edges 14 crossing the longitudinal center line of the strip so as to ensure uniform stress, the process step of forming said openings 26 becomes unnecessary, so that the die and accessory implements can be greately simplified. Thus, changes in the size of the products can be accommodated by changing the shearing cutter. The invention is superior in mass production.

In the conventional article, as shown in FIGS. 13 and 14, the main portion serving to clamp a hose or the like is forked at one longitudinal end thereof and I-shaped at the other end to be received in the fork. Thus, since the halves on both sides of the imaginary winding center line X are different in shape, the bending rigidity can hardly be made uniform on both sides, resulting in poor circularity, and lacking uniformity of clamping force on the hose or the like and smoothness of ring spreading. This conventional arrangement is unsuitable for successively cutting a series of clamps out of a long-sized elongated material of constant width.

In contrast therewith, according to the invention, said pair of inclined linear edges 14 are parallel with each other so that the hose clamping main portion 10 is substantially in the form of a parallelogram, and the opposite ends of the hose clamping main portion 10 positioned on both sides of the imaginary winding center line are of the same or symmetrical simple shape, so that cutting can be carried out in a simple manner and, moreover, the bending rigidity is made uniform on both sides. Thus, the circular ring is superior in circularity and can clamp the hose or the like 22 with uniform force.

Further, in the conventional clamp shown in FIGS. 13 and 14, the hose clamping main portion 28 is a symmetrical or dissimilar with respect to the imaginary winding center line X, so that the pair of operating knobs 30 and 32 integrally formed on the longitudinal opposite ends of said portion can hardly be made similar or symmetrical. Thus, the die and other processing tools to be used are complicated, and it is difficult to ensure that the spreading forces applied to the operating knobs are equal to each other.

In contrast therewith, according to the invention, since a pair of operating knobs 16 are formed at the ends of the hose clamping main portion 10 substantially in the form of a parallelogram, namely, the ends of the major diagonal of the parallelogram, the pair of operating knobs can be made the same or symmetrical when cut, and the winding operation can be simplified. Further, operating forces can be equally and smoothly applied to the operating knobs 16.

As is evident from the foregoing description, the clamp according to the invention can be produced by a very simple cutting and winding operation on a spring metal strip material while ensuring uniform bending stress throughout the periphery of the circular ring. Clamps of the invention can be mass-produced and are useful particularly for connecting fluid-conveying hoses such as those used in homes, industrial machines and various vehicles.

What is claimed is:

1. A clamp of a spring metal strip of uniform thickness having a center line, two intermediate portions and two end portions, each of said end portions being integral with one of said intermediate portions, wherein each of said intermediate portions has a first edge parallel to said center line and a second edge at an angle to said center line such that the second edge crosses said center line, and wherein said strip including said intermediate portions forms a circular portion so that said end portions extend outwardly from the circular portion, with at least a portion of one of said second edges facing the other second edge, thereby providing a uniform bending stress in said circular portion of said clamp;

whereby when said clamp is deformed to expand said circular portion, said expanded portion remains circular.

2. A clamp as defined in claim 1, wherein the intermediate portions are integral.

3. A clamp as defined in claim 1, wherein the clamp further comprises a middle portion between and integral with said intermediate portions, said middle portion having two edge portions parallel to said center line.

* * * * *